Aug. 6, 1957  C. J. BISHOFBERGER  2,801,825
CONTROL APPARATUS

Filed June 7, 1954  2 Sheets-Sheet 1

INVENTOR
CARL J. BISHOFBERGER
BY George H Fisher
ATTORNEY

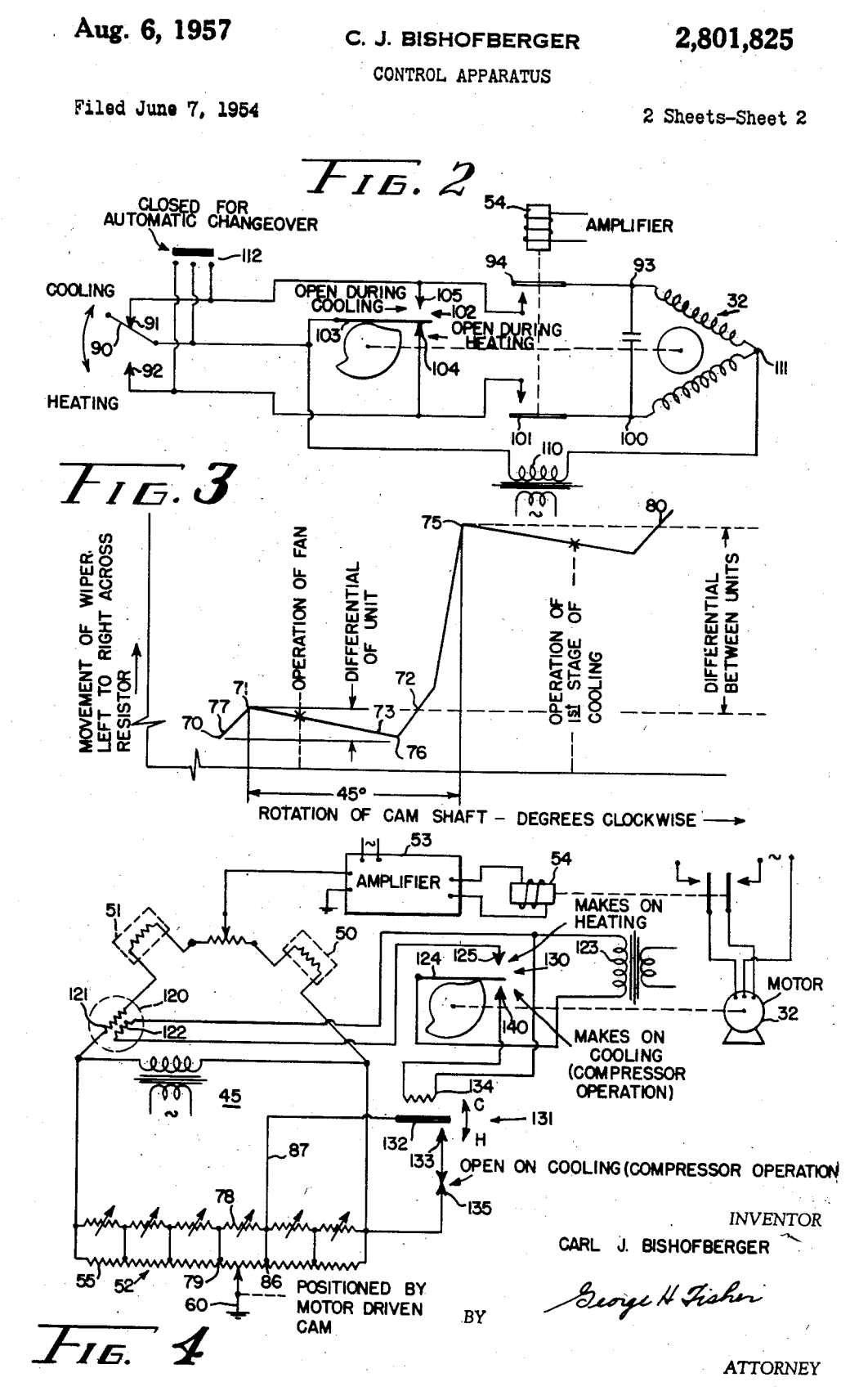

Aug. 6, 1957  C. J. BISHOFBERGER  2,801,825
CONTROL APPARATUS
Filed June 7, 1954  2 Sheets-Sheet 2

INVENTOR
CARL J. BISHOFBERGER
BY George H. Fisher
ATTORNEY

United States Patent Office 2,801,825
Patented Aug. 6, 1957

2,801,825

CONTROL APPARATUS

Carl J. Bishofberger, Minneapolis, Minn., assignor to Minneapolis-Honeywell Regulator Company, Minneapolis, Minn., a corporation of Delaware Application June 7, 1954, Serial No. 435,017

18 Claims. (Cl. 257—3)

The present invention is concerned with an improved temperature control apparatus, in particular, apparatus for controlling multistage installations having two stages of heating, ventilation, and two stages of cooling, in which automatic switch-over from one to another occurs in response to a temperature responsive device.

With the present market for residential air-conditioning apparatus incorporating heating, ventilation, and cooling equipment, there is a need for an improved step controller for controlling such equipment to maintain a predetermined temperature in the residence. Control apparatus for such residential air-conditioning must be adaptable to various types of installation and yet to reduce amortized manufacturing and distribution costs by mass production one model of the control apparatus adaptable to various needs is desired. Such a control apparatus must be flexible in meeting the requirements of any particular installation, as well as, complete enough to require a minimum amount of associated equipment.

The present invention is directed to an improved temperature control apparatus having a step controller to which associated air-conditioning equipment is connected without the use of auxiliary relays.

It is therefore an object of the present invention to provide an improved control apparatus for air conditioning.

It is a further object of the present invention to provide an improved step controller for controlling heating, ventilating, and cooling apparatus in an air-conditioning system.

It is a still further object of the present invention to provide an improved control apparatus for controlling a motor for selective operation in a first or second range and automatic change-over between the ranges.

It is another object of the present invention to provide in air-conditioning system having heating, ventilating, and cooling apparatus, improved apparatus for controlling the transfer from heating to ventilation and to cooling, and upon a transfer in the reverse direction means for rendering the ventilating apparatus ineffective until the moisture has drained from the cooling apparatus.

It is still another object of the present invention to provide an improved step controller having a plurality of switches each operating within its predetermined portion of the total range of operation of the step controller and apparatus for deenergizing the step controller only intermediate the adjacent ranges.

These and other objects will become apparent upon a study of the following specification and drawing wherein:

Figure 2 is a schematic showing of a motor control circuit providing for manual change-over or automatic change-over of the control apparatus between heating and cooling.

Figure 3 is a graphical representation of the operation of the step controller rebalance in which movement of the rebalance wiper is plotted as a function of the rotation of the cam shaft.

Figure 4 is a schematic showing of a bridge circuit and the associated motor control apparatus.

Figure 1:
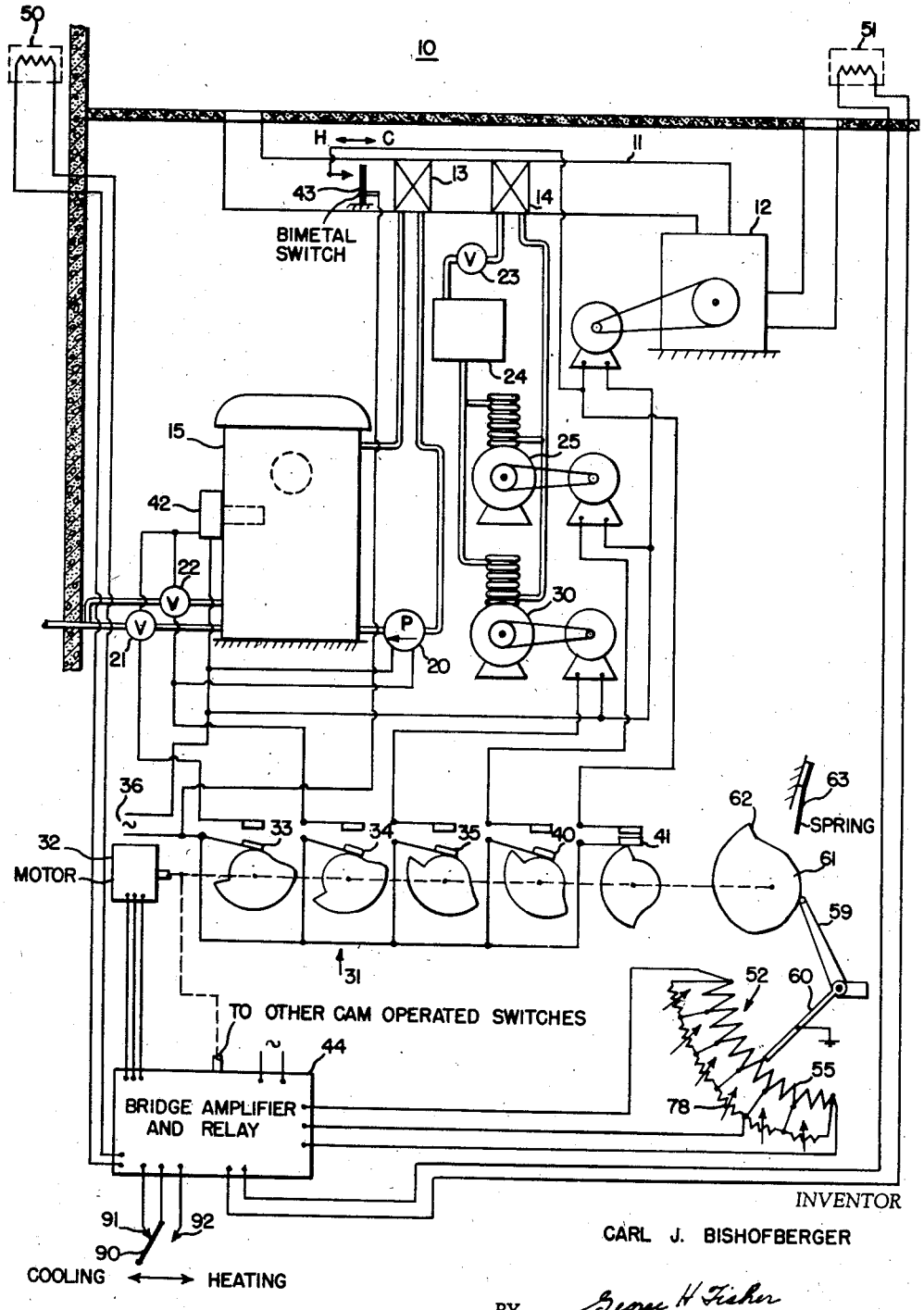
Figure 1 is a schematic showing of the control apparatus applied to an air-conditioning system using conventional heating, ventilation, and cooling equipment.

In Figure 1, a conventional air-conditioning system is shown for controlling the temperature in a space 10 by circulating air from the space through a duct 11 by a fan 12, the air passing through a heating coil 13 and a cooling coil 14. Heating coil 13 is connected to a boiler 15 and hot water is circulated through the coil upon the operation of a pump 20. Heat is supplied to the boiler by a two-stage burner receiving fuel through valves 21 and 22 from a source, not shown. Cooling coil 14 is connected to a conventional two-stage refrigeration system having an expansion valve 23 and a receiver tank 24 into which the refrigerant is compressed by compressors 25 and 30.

A step controller 31 driven by a motor 32 has a plurality of cam operated switches 33, 34, 35, 40, and 41. Switches 33 and 34 connect valves 21 and 22, respectively, as well as, pump 20 to a source of power 36, the pump being energized whenever switch 34 energizes the first stage of heating. The valves 21 and 22 are connected to a conventional limit control 42 for rendering the heating means inoperative whenever the temperature of the water exceeds a predetermined value. Switches 35 and 40 are connected to control the operation of the motors driving compressors 30 and 25, respectively. Switch 41 is connected to a motor driving fan 12; however, during heating when switch 41 is open the fan motor is energized through a circuit containing bimetal switch 43 which acts as a conventional bonnet control. Switch 43 closes when the temperature of the air ahead of the heating coil reaches a predetermined value to begin the circulation of air to space 10.

Step controller 31 is controlled by a bridge amplifier and relay 44 through motor 32. A bridge network circuit 45, shown in more detail in Figure 4, contains an outdoor temperature responsive element 50, an indoor temperature responsive element 51 and a rebalance potentiometer 52. The output of the bridge is fed into an amplifier 53 both of a sort similar to the disclosure in the A. P. Upton Patent 2,423,534, issued July 8, 1947, which controls the operation of a relay 54 thereby controlling motor 32. Again referring to Figure 1, rebalance potentiometer 52 comprises a main resistor 55 having a series of taps thereon between which adjustable shunts are connected for characterizing the potentiometer. A wiper 60 engaging resistor 55 is positioned by a follower 59 contacting an irregular cam 61 connected to the step controller shaft so that as the step controller moves in a clockwise direction wiper 60 is moved downward on resistor 55 in an irregular manner as determined by the contour of cam 61. As the cam rotates in an extreme clockwise position a projection 62 engages a spring 63. This spring providing for a reversed movement of the step controller from its extreme clockwise position, upon power failure, to open switch 35 so that upon restoration of power to the control system both compressors 25 and 30 are not connected to source of power 36 simultaneously.

Whenever bridge network circuit 45 of Figure 4 becomes unbalanced due to a change in the space temperature as sensed by element 51 or a change in the outdoor temperature as sensed by element 50, motor 32 is energized to reposition the step controller to regulate the heating, ventilating, and cooling apparatus and rebalance the bridge by movement of wiper 60. As the switches of the step controller control the air-conditioning apparatus directly it is desired that they be positively closed or opened to prevent any damage to the contacts such as "frying." With a conventional rebalance potentiometer it would be possible for the bridge circuit to be balanced at any position; however, a novel means is provided for deenergizing motor 32 by a balance of the bridge only when each of the step controller switches is either completely open or closed.

Referring to Figure 3 a graphical representation of the movement of wiper 60 downward from left to right on resistor 55, as shown in Figure 1, and to the right as shown in Figure 4, is shown as a function of the rotation of the step controller cam shaft as it rotates in a clockwise direction. As shown, the position of the wiper is somewhere on the initial rising portion of the plotted line between points 70 and 71. Assume bridge 45 becomes unbalanced by an increase in the space temperature so that resistance element 51 increases in value and motor 32 is energized to rotate the step controller clockwise to turn on ventilation. Wiper 60 is moved downward on resistor 55 as shown in Figure 1. Balance of the bridge will exist at some position of wiper 60 above the point 72 which coincides with point 71 on the graphical plot. Thus, an approximate 35 degree rotation of the step controller shaft is necessary before balance can possibly occur as wiper 60 reverses in direction as cam follower 59 approaches a rising portion on the cam 61, this reversed operation shown by the negative sloped portion of the plot indicated by 73. During this movement of the cam shaft operation of switch 41 occurs at the point indicated by the cross to turn on the fan and by the time the cam has reached a position where wiper 60 can possibly balance the bridge a positive contact is made by switch 41. Of course, an unbalance of the bridge in the opposite direction would result in a reverse operation as balance of the bridge could now only occur when the wiper had reached that position on the rebalance resistor 52 below the point indicated on the plot as 77 which coincides with 76, this assures positive operation of switch 41 in an opening direction as the cam rotates counterclockwise. Assuming that space temperature continued to increase so that cooling other than ventilation was necessary, the bridge would be further unbalanced and motor 32 would rotate the step controller clockwise. When the position was reached by the wiper as indicated by point 75, on the graph in Figure 3, and still balance did not exist, further movement of the step controller clockwise again causes a reverse movement of wiper 60 as follower 59 reaches another rising portion on the cam 61 and the cam shaft rotates until the wiper reaches a position indicated by 80. Operation of switch 35 for the first stage of cooling is indicated by the cross on the plot.

While Figure 3 represents the movement of the wiper 60 on resistor 55 for rebalance, it should be understood that this is only a portion of the total movement of the wiper and that a similar plot would exist for each of the switches of the step controller thus assuring that the control apparatus could not be balanced at any position of the step controller which did not produce positive operation of the switches in either an open or closed position. By the proper characterization of the resistor 55 by adjusting the amount of shunting resistance and the design of the irregular surface of cam 61 it is possible to adjust the temperature differential between adjacent switches as well as the operating differential of each individual switch of the step controller. By reducing the resistance between the respective taps on the resistor 55 a greater amount of movement of wiper 60 is necessary to balance the bridge for a given temperature change.

The differential between units is adjusted by the characterization of resistor 55 by the variable shunting resistors and, in particular, resistor 78 is adjusted to change the resistance between taps 79 and 86 to establish the number of degrees change in element 51 necessary to move rebalance wiper 60 an amount between points 72 and 75. Thus it is apparent that the differential between the units connected to switches 33 to 35, 40, and 41 is adjustable by characterizing resistor 55 with the associated shunting resistors. The selected differential will depend on what the particular adjacent switches are controlling, for example, the differential between switches 35 and 40 would by necessity be larger to prevent the second stage of cooling from operating unless necessary thereby eliminating short running periods of the second stage.

The amount of reverse movement of wiper 60, for example between points 71 and 76, is determined by the irregular surface of cam 61. The temperature change necessary, as experienced by element 51, to cause operation of motor 32 to move wiper 60 between points 77 and 71 or 72 and 76 indicates the operating differential of the particular unit or fan 12, it also being established by the design of the surface of cam 61. The temperature change of element 51 requiring a movement of wiper 60 between points 72 and 75 to rebalance bridge 45 indicates the operating differential between the adjacent units, in this case, being fan 12 and the first stage of cooling or compressor 25.

Referring to Figure 2, the motor control circuit comprises a manual switch 90 engaging contacts 91 and 92 whenever cooling or heating is desired, respectively. Contact 91 is connected to input terminal 93 of motor 32 whenever blade 94 engages its associated contact in response to the output of relay 54. Motor 32 is of the two phase reversible type having a phase shifting condenser connected between terminal 93 and a second input terminal 100. Contact 92 is connected to terminal 100 by a second alternatively operated blade 101 whenever it engages its associated contacts upon the reverse operation of relay 54. A cam operated switch 102 has a movable blade 103 engaging either a heating contact 104 connected to contact 92 or a cooling contact 105 connected to contact 91 depending upon the range of the step controller. Blade 103 and switch 90 are connected to a source of power 110 as well as a third terminal 111 of motor 32. When switch 90 engages contact 91, motor 32 operates in response to the relay 54 to reversibly position the step controller in the cooling range it being driven in a clockwise direction when blade 94 engages its contact and in a counterclockwise direction when blade 101 engages its contact. Should the step controller rotate counterclockwise to enter the heating range blade 103 disengages contact 104 to open the motor control circuit so that automatic change-over will not exist. When the switch 90 engages contact 92 for the heating operation, the step controller cannot enter the cooling range of operation as blade 103 disengages contact 105 to disconnect the motor. Should automatic change-over be desired a shunting switch 112 shorts out switch 90 and contacts 91 and 92 so that operation of the step controller extends automatically between the two ranges of heating and cooling.

Referring to Figure 4 a conventional cycler 120 having a temperature responsive element 121 is connected into the bridge circuit. A heater 122 which is connected to a source of power 123 whenever a blade 124 engages contact 125 of a cam operated switch 130 selectively heats element 121 to unbalance the bridge. The cam is controlled by step controller motor 32. The cycler provides for the conventional heat anticipation whenever the control apparatus is used in the heating range, that is, when switch 90 engages contact 92 or the automatic changeover switch 112 is closed.

A warp switch 131 has a bimetal 132 which engages a contact 133 when the bimetal is heated by a heater 134. Bimetal 132 is connected to tap 86 by a conductor 87 and upon engaging contact 133 shunts a portion of the bridge circuit through a circuit comprising a switch 135 which is normally open whenever either one of the compressors are energized, that is, when switches 34 and 35 are closed. Switch 135 is also a conventional cam operated switch, the cam (not shown) being driven by motor 32. Heater 134 is energized by a source of power 123 whenever blade 124 engages the contact 140, this being the case whenever the step controller is in that range of operation where switches 34 and 35 are made and the compressors are operating. After an extended period of operation in the cooling range, bimetal 132 would be heated to engage contact 133. As the space temperature decreased and no more cooling is necessary motor 32 rotates the step controller in a counterclockwise direction to shut off both of the compressors, that is, break switches 34 and 35; however, it is possible that balance would normally occur at a position of the step controller with the fan still in operation. This would be undesirable as a considerable amount of frost would have collected on cooling coil 14 during the cooling operation and as the coil increased in temperature the moisture is evaporated and is carried into space 10 to increase the space relative humidity. To allow the moisture on the cooling coil to melt and drain off, the bridge shunt as established by the circuit through the warp switch 131 and switch 135 readjusts the bridge so that balance can only occur at a position of the step controller rebalance wiper 60 as determined by motor 32 with switch 41 open and the fan not in operation. As the heater 134 is only energized during the range where compressor operation exists, warp switch 131 cools off and after a predetermined time delay the bridge shunt is broken and operation of the fan is reestablished.

Operation

As shown in Figure 1, the space temperature is satisfied and the bridge is balanced at a position of the step controller where none of the air-conditioning apparatus is in operation. Manual change-over switch 90 is in a cooling position so that as the temperature in the space increases and temperature responsive element 51 causes an unbalance in the bridge circuit and motor 32 will rotate the step controller clockwise to first close switch 41 to initiate operation of fan 12. At the same time follower 59 moves wiper 60 downward across resistor 55 to rebalance the bridge. As the follower 59 approaches the rising portion on the cam, the motion of the wiper is reversed for a predetermined portion of the rotation of cam 61, as graphically represented by the negative sloping line 73, in Figure 3, so that switch 41 is positively made before the bridge is balanced. This movement of wiper 60 is indicated in Figure 3 between points 77 and 72. A further increase in the space temperature results in rotation of the step controller in a continued clockwise direction and the wiper again reverses direction so that balance of the bridge will not occur until the switch 40 of the first stage of cooling is positively made. This movement is indicated between points 75 and 80 in Figure 3. A similar occurrence will exist should the space temperature continue to remain higher than the desired value so that a second stage of cooling is required.

Should the differential between the adjacent units, such as, the first stage of cooling and the fan operation need adjustment the shunting resistor in particular resistor 78 connected in parallel with resistor 55 for the differential between the fan and the first compressor is adjusted to characterize the rebalance potentiometer.

Movement of the step controller is assured in the range in which any one of the step controller switches 33 to 35, 40, and 41 either closes or opens as negative movement of rebalance wiper 60 is provided by the irregular shape of cam 61. For example, referring to Figure 3, the step controller motor will never stop in the range between points 71 and 76 regardless which direction motor 32 is operating, this being the case for a portion of the total range of movement of the step controller in which each of the switches operates. With such an arrangement a relatively simple, large load carrying switch can be used even though the operation of the step controller is relatively slow as there is no chance of the step controller stopping until all switches are either positively closed or open. This is especially advantageous as a single inexpensive unit is used for controlling heating, ventilating, and cooling apparatus without the use of auxiliary switches.

Referring to the motor control circuit of Figure 2, as shown the motor would only operate the step controller in the range for cooling, that is, to operate switches 35, 40, and 41. Should the space temperature decrease below the desired control point and an unbalance of the bridge cause rotation of the motor in a counterclockwise direction, upon entering the heating range before operation of switch 34 occurred, blade 103 would be moved away from contact 104 to break the power circuit of motor 32, this preventing its further operation in that direction as long as the manual switch was in the cooling position. Movement of switch 90 in the heating position provides for operation of the step controller in the range to control switches 33 and 34. Upon an increase of the space temperature above the control temperature, continuous operation of the fan, that is, the closing of switch 35 could not exist, as upon entering the cooling range blade 103 moves away from contact 105 and further operation in that direction is prevented. Switch 112 shunts switch 90 and 102 so that automatic change-over is provided between the heating and cooling apparatus.

In order not to exceed the maximum load requirements of the existing power lines a novel means is used to prevent simultaneous operation of the cooling stages upon restoration of power after a power failure. With the step controller in the extreme clockwise direction so that both stages of cooling are in operation projection 62 on cam 61 engages spring 63 and upon power failure the spring causes counterclockwise rotation of the step controller to open switch 35. When power is restored compressor 25 is energized before the step controller is returned to its original position to energize compressor 30.

Whenever there is a need for cooling and either one or both of the compressors are running and cooling coil 14 is cold and a considerable amount of frost collects on the coil. Upon satisfaction of the space temperature and the first and second stages of cooling are turned off, it is desired that the operation of the fan be delayed for a predetermined period such as five minutes until coil 14 is warmed up a sufficient amount so that the moisture drains off. While in the cooling range, when the compressors are operating, warp switch 131 is heated by heater 134. Upon the satisfaction of the space temperature the step controller is rotated counterclockwise to open switch 35 and 40 and switch 135 is closed. The series circuit comprising warp switch 131 and switch 135 shunts out a portion of the bridge circuit so that balance of the bridge cannot exist until wiper 60 is moved by the step controller out of the range of operation of the fan (even though normally fan operation would exist) until switch 41 is opened. This allows coil 14 to drain and the moisture on the coil is not carried into the space when the fan operation is reestablished. Obviously the relative humidity of the space would increase should such an occurrence take place every time the compressors were energized for a short period. As soon as warp switch 131 cools the shunt is removed from the bridge circuit and balance under the same spaced temperature conditions occurs after the step controller repositions wiper 60 and contact 41 is closed to energize the fan.

It is obvious that the control apparatus described above should not be restricted to the sort of air-conditioning equipment for heating, cooling, and ventilation shown as this is only done for illustrative purposes. It is intended that the scope of the present invention be limited only by the appended claims.

I claim as my invention:
1. In control apparatus for controlling first, second, and third condition changing means; switch means for controlling the operation of each of said condition changing means; motor means for controlling the operation of said switch means whereby operation of said first, second and third condition changing means is initiated in the order named when said motor means operates in a forward direction; bridge network circuit means for controlling the operation of said motor means, said bridge network means having means responsive to a condition indicative of a need of operation of any one of said condition changing means; rebalance means associated with said circuit means and driven by said motor means, said rebalance means being effective only intermediate adjacent ranges of operation of said motor means in which operation of one of said switch means occur: time delay switch means, said delay means being energized whenever said third condition changing means is energized; motor driven switch means, said motor driven switch means being closed whenever either said first or second condition means are energized; circuit means including said delay switch means and said motor driven switch means for shunting a portion of said bridge network circuit means so that upon reverse operation of said motor means to deenergize said third condition changing means and energize said second condition changing means a delay in the operation of said second condition changing means occurs: further circuit means associated with said bridge network circuit means comprising relay means controlled in response to the output of said network circuit means; manual selector switch means; second motor driven switch means; and means including said relay means, when positioned in one position, for connecting said motor means to a source of power whereby operation of said motor means is possible in one direction and when positioned in another position for connecting said motor means to said source of power whereby operation of said motor means is possible in the opposite direction: and further circuit means including said second motor driven switch means for selectively shunting said selector switch means whereby operation of said motor means exists in either direction in a first of said ranges when said selector switch means is in said one position and operation of said motor means exists in either direction in a second of said ranges when said selector switch means is in said second position.

2. In control apparatus for controlling first, second, and third condition changing means: switch means for controlling the operation of each of said condition changing means; motor means for controlling the operation of said switch means whereby operation of said first, second and third condition changing means is initiated in the order named when said motor means operates in a forward direction; bridge network circuit means for controlling the operation of said motor means, said bridge network means having means responsive to a condition indicative of a need of operation of one of said condition changing means: rebalance means associated with said circuit means and driven by said motor means, said rebalance means being effective only intermediate adjacent ranges of operation of said motor means in which operation of one of said switch means occur: time delay switch means, said delay means being energized whenever said third condition changing means is energized; motor driven switch means, said motor driven switch means being closed whenever either said first or second condition means are energized: second motor control circuit means comprising relay means controlled in response to the output of said network circuit means; manual selector switch means; and second motor driven switch means: first circuit means including said relay means, when positioned in one position, for connecting said motor means to a source of power whereby operation of said motor means is possible in one direction, second circuit means including said relay means, when positioned in a second position, for connecting said motor means to said source of power whereby operation of said motor means is possible in the opposite direction: and further circuit means including said second motor driven switch means for selectively shunting said selector switch means whereby operation of said motor means exists in either direction in a first range when said selector switch means is in said one position and operation of said motor means exists in either direction in a second range when said selector switch means is in said second position.

3. In temperature control apparatus for both cooling and heating; motor driven step controller means for controlling the operation of first and second stages of heating; a fan; and first and second stages of cooling, said step controller providing for a switching operation of a power source to each of said second and first stages of heating, said fan, and said first and second stages of cooling in the order named; bridge network circuit including a plurality of temperature responsive means, said circuit having an output for operating said step controller means; selectively reversible operated rebalance means connected to said network circuit for balancing said network circuit upon the operation of said step controller means, said rebalance means being moved in the reverse direction during said switching operation so that balance of said bridge network circuit occurs at selected positions of said motor intermediate said switching operation; warp switch means, said warp switch means being heated to a closed position when said step controller is in a position to energize said first stage of cooling; switch means, said last mentioned switch means being closed when said step controller is in a position to energize the fan; and circuit means including said warp switch means and said last mentioned switch means to temporarily modify said circuit when transferring from cooling operation to fan operation so that balance of said network circuit when said motor in the position in which said fan is connected to said power source is temporarily prevented.

4. In temperature control apparatus for controlling the operation of both cooling and heating apparatus; motor driven step controller means for selectively connecting to a source of power a second and first stages of heating, a fan, and first and second stages of cooling in the order named; bridge network circuit means including a plurality of temperature responsive elements; means connecting said circuit means in a manner to control said step controller motor means; and rebalance means operated by said step controller means for rebalancing said network circuit means, said rebalance means including a rebalance cam for positioning a movable member of a potentiometer in said network circuit in a reversed direction at predetermined positions of said step controller so that balance is impossible at positions of said step controller when any one of said heating stages, said fan, and said cooling stages are not fully connected or disconnected from said source.

5. In control apparatus for controlling first, second, and third condition changing means; switch means for controlling the operation of each of said condition changing means; motor means for controlling the operation of said switch means whereby operation of said first, second, and third condition changing means is initiated in the order named when said motor means operates in a forward direction; bridge network circuit means for controlling the operation of said motor means, said bridge network means having means responsive to a condition indicative of a need of operation of one of said condition changing means; rebalance means associated with said circuit means and driven by said motor means; time delay switch means, said switch means being closed whenever said third condition changing means is energized; motor driven switch means, said motor driven switch means being closed whenever either said first or second condition means are energized; and circuit means including said delay switch means and said motor driven switch means adapted to shunt a portion of said bridge network circuit means so that upon reverse operation of said motor means to deenergize said third condition changing means said motor means is temporarily driven beyond that position in which said second condition changing means is energized until said delay switch opens.

6. In control apparatus for controlling the operation of temperature control apparatus; reversible motor driven step controller means, said step control means controlling heating means in a first range of operation of said motor and cooling means in a second range of operation of said motor; temperature responsive switch means for controlling the operation of said motor, said switch means comprising a first circuit and a second circuit; manually operated selector switch means; a source of power; means including said selector switch means and said temperature responsive switch means for connecting said motor to said source of power whereby either said first circuit or said second circuit is effective to render said motor operative when said selector switch means is in a first or second position; further switch means controlled by said motor for shunting the second position of said selector switch means when said motor is in said first range and shunting the first position of said selector switch means when said motor is in said second range thereby said motor is restricted to operation in one of said ranges as determined by said selector switch means; and shunt switch means for shunting said selector switch means so that operation of said motor means exists coextensive said first and second ranges.

7. In control apparatus for controlling the operation of temperature changing apparatus; reversible motor means for controlling temperature changing apparatus in a first range for heating and a second range for cooling; temperature responsive switch means; selector switch means; means including said temperature responsive switch means and said selector switch means when in a first position for connecting said motor means to a source of power so that said motor will operate in one direction upon the operation of said responsive switch in a first position, further means including said temperature responsive switch means and said selector switch means when in a second position for connecting said motor means to said source so that said motor means will operate in the opposite direction upon the operation of said responsive switch in a second position; and motor driven switch means for shunting said selector switch means so that modulating operation of said motor means will occur in said first range when said selector switch means is in a first position and in said second range when said selector switch means is in a second position.

8. In motor control apparatus, motor means, means responsive to a condition indicative of a need of operation of said motor means, control means including said responsive means for controlling the operation of said motor, said motor means having a total range of operation selectively divided into a plurality of segments, rebalance means associaed with said control means, said rebalance means being positioned by said motor means, and means associated with said rebalance means providing reverse movement of said rebalance means when said motor means is operating in any one of said segments so that balance of said control means occurs only at predetermined positions of the total range of said motor means intermediate said segments.

9. In motor control apparatus; motor means; responsive means responsive to a condition indicative of a need of operation of said motor means; relay means including said responsive means for controlling the operation of said motor means in a first and second range, said relay means having a first and second circuits; switch means having a first and second positions; means including said switch means, when in said first position, and said first circuit for connecting said motor means to a source of power whereby operation of said motor occurs in one direction; further means including said switch means, when in the second position, for connecting said motor means to said source of power whereby operation of said motor occurs in the opposite direction; and motor driven switch means for shunting said first mentioned switch means when in one position or the other so that when said first mentioned switch means is in said first position said motor means is modulatively operative in said first range and when said first mentioned switch is in said second position said motor means is modulatively operative in said second range.

10. In temperature controller apparatus; motor driven means for selectively controlling heating means, ventilating means, and cooling means in the sequence mentioned upon a movement of said motor means in a forward direction; control means for controlling the operation of said motor means; said control means comprising bridge network circuit means having a temperature responsive element; first delayed-action switch means, said switch means being in the closed position when said motor means is in a position to render said cooling means effective, motor driven switch means normally open when said cooling means is operative, circuit means including said delayed action switch means and said motor driven switch means adapted to shunt out a portion of said bridge circuit means so that upon reverse operation of said motor means from said cooling position said bridge circuit means is unbalanced to such an extent that said ventilation means is rendered inoperative for a predetermined period.

11. In an air conditioning system control apparatus, the system having a heating device, a ventilation device and a cooling device, motor means adapted for selectively controlling the heating device, the ventilation device, and the cooling device in the order named, control means including temperature responsive means for controlling the operation of said motor means, delay action means normally energized when the cooling device is operative, rebalance means associated with said control means, means including said delay action means for temporarily modifying said rebalance means upon a transfer from cooling to ventilation so that the ventilation device is rendered inoperative for a predetermined period.

12. In motor control apparatus, motor means for controlling a plurality of condition changing means in sequence, condition responsive means responsive to a condition indicative of a need of operation of said motor means, circuit connection means connecting an output of said condition responsive means in controlling relation to said motor means, said motor means having a first, second, and third operating ranges, time delay switch means, means initiated by said motor when in said third range for energizing said delay switch means, and further switch means including said delay switch means for modifying and said circuit connection means and thus said output for modifying said output when said motor returns to said second range for driving said motor means to said first range for a predetermined time.

13. In motor control apparatus, motor means for controlling at least a first, second, and third condition changing means in the order named when said motor is operated in a first direction, switch means associated with each of said changing means, each of said switch means being operated either on or off to control the operation of its respective condition changing means in a predetermined portion of the total range of operation of said motor means, control means for said motor means, said control means including responsive means responsive to a condition indicative of the need of operation of any one of said condition changing means, motor driven rebalance means, said rebalance means being connected to said control means, means for scheduling said rebalance means so that when said control means is balanced said motor means is deenergized at a position intermediate any two of said portions of the total range of operation, motor driven delay action switch means normally energized when said third condition responsive means is energized, switch means normally open when said motor means is in the range of operation of said third condition changing means connecting said delay switch means to said control means so that upon reverse operation of said motor means, said motor means won't stop in said portion of its operation range associated with said second condition responsive means.

14. In control apparatus for controlling the operation of a plurality of condition changing means in sequence, step controller means comprising a plurality of switches, each being connected to control one of said condition changing means, condition responsive means, bridge network circuit means including said condition responsive means for controlling said step controller means, follow-up means connected to said step controller means for rebalancing said network circuit means, said follow-up means comprising a resistor having an associated wiper positioned thereon by an irregular cam operated by said step controller means, said cam providing for movement of said wiper in a direction to unbalance said bridge network circuit means whenever said step controller means approaches a position for operation of any of said switches thereby providing positive operation of said switches.

15. In control apparatus for controlling the operation of a plurality of condition changing means, motor means for operating a plurality of switch means in sequence, each of said switch means controlling the operation of one of said condition changing means, each of said switch means operating in its particular portion of the total range of operation of said motor means, rebalance means operated by said motor means, condition responsive control means for controlling the operation of said motor means, and means associated with said rebalance means for providing reverse movement of said rebalance means in each of said particular portions of the operating range of said motor means whereby balance of said control means only exists intermediate said portions.

16. In control apparatus for controlling the operation of a plurality of condition changing means, plurality of switch means, each of said switch means controlling the operation of its respective condition changing means, motor means for operating said plurality of switch means whereby said condition changing means are operated in sequence, condition responsive control means, means connecting said control means in operative relation to said motor means, means including said motor means for operating each of said switch means in its predetermined portion of the total operating range of said motor means, rebalance means associated with said control means, and means associated with said rebalance means reversing its effect in said predetermined portions of said total range so that balance only occurs intermediate said portions.

17. In control apparatus, motor means having a limited range of reversible operation, a plurality of switches, means connecting said motor means in a manner to operate said switch means in sequence, each of said switch means being operated in a selected portion of the total range of operation of said motor means, network circuit means having means responsive to a condition indicative of a need of operation of said motor means, means connecting said network circuit means in a controlling relation to said motor means, rebalance means connected in said network circuit means, said rebalance means comprising a potentiometer with a movable member, means including said motor for moving said movable member successfully in an unbalancing and balancing direction through said selected portions whereby balance of said network circuit means occurs intermediate adjacent portions of said total range of operation of said motor means, such providing for positive operation of said each of said switch means in either the opening or closing direction.

18. In control apparatus, reversible motor means having a limited total range of operation, a plurality of switch means each effective to control the operation of its respective condition changing means, connection means connecting said motor means to said switch means so that each of said switch means operates in its particular portion of the total range of operation of said motor means, control means for controlling the operation of said motor means, said control means having means responsive to a condition indicative of a need of operation of any one of said condition changing means, rebalance means for balancing said control means, said rebalance means being positioned by said motor means, and means associated with said rebalance means for preventing balance of said control means in any one of said portions of the total range of operation of said motor means so that said motor means is only deenergized when each of said switch means are not either fully open or fully closed.

References Cited in the file of this patent
UNITED STATES PATENTS

| | | |
|---|---|---|
| 2,196,687 | Steinfeld | Apr. 9, 1940 |
| 2,245,369 | Smith | June 10, 1941 |
| 2,508,162 | Herwald | May 16, 1950 |
| 2,544,544 | Qually et al. | Mar. 6, 1951 |